US009026158B1

(12) United States Patent
Choi et al.

(10) Patent No.: US 9,026,158 B1
(45) Date of Patent: May 5, 2015

(54) SYSTEMS AND METHOD FOR SCHEDULING MEASUREMENT GAPS AND ON-DURATION INTERVALS IN WIRELESS COMMUNICATION SYSTEMS

(75) Inventors: Jihwan P. Choi, San Jose, CA (US);
Jiwon S. Han, San Ramon, CA (US);
Hui-Ling Lou, Sunnyvale, CA (US)

(73) Assignee: Marvell International Ltd. (BM)

( * ) Notice: Subject to any disclaimer, the term of this patent is extended or adjusted under 35 U.S.C. 154(b) by 392 days.

(21) Appl. No.: 13/537,256

(22) Filed: Jun. 29, 2012

Related U.S. Application Data

(60) Provisional application No. 61/507,480, filed on Jul. 13, 2011, provisional application No. 61/650,929, filed on May 23, 2012.

(51) Int. Cl.
*H04W 28/08* (2009.01)
*H04W 84/18* (2009.01)
*H04W 4/12* (2009.01)

(52) U.S. Cl.
CPC ...................................... *H04W 4/12* (2013.01)

(58) Field of Classification Search
CPC . H04W 36/0088; H04W 36/14; H04W 24/10; H04W 28/048; H04W 28/18; H04W 52/0216; H04W 72/1226; H04W 84/12
See application file for complete search history.

(56) References Cited

U.S. PATENT DOCUMENTS

| 8,767,616 B2* | 7/2014 | Choi et al. ..................... 370/317 |
| 2004/0023672 A1* | 2/2004 | Terry ............................. 455/458 |
| 2004/0102199 A1* | 5/2004 | Haumont ....................... 455/458 |
| 2005/0148348 A1* | 7/2005 | Cramby et al. ............... 455/458 |
| 2010/0035624 A1 | 2/2010 | Tseng |
| 2010/0159950 A1* | 6/2010 | Toh et al. .................... 455/456.1 |
| 2011/0142144 A1* | 6/2011 | Allpress et al. ............... 375/259 |
| 2011/0170483 A1 | 7/2011 | Ishii |
| 2014/0269397 A1* | 9/2014 | Pelletier et al. ............... 370/252 |

* cited by examiner

*Primary Examiner* — Bobbak Safaipour

(57) ABSTRACT

Systems, methods, and other embodiments associated with scheduling of measurement gaps and on-duration intervals for a wireless station are described. According to one embodiment, a controller for controlling a station that wirelessly communicates with a base station is disclosed. The station is within a wireless range of the base station and one or more neighboring stations. The controller includes a scheduling logic configured to control the station, while the station is in an idle mode, to receive control information from the base station by scheduling a period of time for an on-duration interval. The scheduling logic is configured to control the station to listen to the one or more neighboring stations by scheduling a period of time for a measurement gap. The measurement gap is scheduled to avoid overlapping with the on-duration interval.

19 Claims, 3 Drawing Sheets

SYSTEMS AND METHOD FOR SCHEDULING MEASUREMENT GAPS AND ON-DURATION INTERVALS IN WIRELESS COMMUNICATION SYSTEMS

CROSS REFERENCE TO RELATED APPLICATIONS

This patent disclosure claims the benefit of U.S. Provisional Application No. 61/507,480 filed on Jul. 13, 2011 and U.S. Provisional Application No. 61/650,929 filed on May 23, 2012, which are hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Power consumption is an important consideration for mobile devices that use batteries. To address power consumption concerns, mobile devices use many different approaches to conserve power. One example of a power saving feature is discontinuous reception (DRX) mode. The DRX mode conserves power by periodically placing wireless communication components of a mobile device into a low power state.

The DRX mode is composed of different time periods. For example, the DRX mode includes an on-duration interval when the wireless communication components are briefly powered on and an inactive interval when the components are in the low power state. The on-duration interval is necessary to maintain communications with a base station even though the mobile device is in the DRX mode to conserve power. Additionally, when using the DRX mode, the mobile device still needs to perform other functions that are necessary to maintain certain other functions e.g., handover capabilities.

For example, a mobile device has a wireless range that is used to communicate to a first base station. Suppose that the mobile device moves between different locations, which changes the distance between the mobile device and the first base station (as well as other nearby base stations). When the mobile device leaves the wireless range of the first base station, communications transition to a second base station that is within the wireless range. For the transition to occur seamlessly, the mobile device periodically measures properties of signals from neighboring base stations (e.g., the second base station) while still communicating with the first base station. A period of time when the mobile device performs the measurements is a measurement gap. The measurement gap permits the mobile device to obtain information about the neighboring base stations that is used when moving between base stations.

However during the measurement gap, the mobile device cannot receive communications from the first base station, which can cause communication difficulties between the mobile device and the first base station. These difficulties can result in throughput loss, which is undesirable.

SUMMARY

In general, in one aspect this specification discloses a controller for controlling a station that wirelessly communicates with a base station. The station is within a wireless range of the base station and one or more neighboring stations. The controller includes a scheduling logic configured to control the station, while the station is in an idle mode, to receive control information from the base station by scheduling a period of time for an on-duration interval. The scheduling logic is configured to control the station to listen to the one or more neighboring stations by scheduling a period of time for a measurement gap. The measurement gap is scheduled to avoid overlapping with the on-duration interval.

In general, in another aspect this specification discloses a method for controlling a station that communicates wirelessly with a base station. The station is within a wireless range of the base station and one or more neighboring stations. The method includes scheduling, for the station, a first time interval for when the station receives control information about a communication channel with the base station. The first time interval is an on-duration interval of the station. The station is in an idle mode. The method includes scheduling, for the station, a second time interval for when the station listens to the one or more neighboring stations. The second time interval is a measurement gap and the second time interval is scheduled to avoid overlapping with the on-duration interval.

In general, in another aspect this specification discloses a method for controlling a station to communicate wirelessly with a base station and one or more neighboring stations. The method includes scheduling, for the station, a first time interval when the station receives information from the base station. The first time interval is an on-duration interval of the station. The method includes scheduling, for the station, a second time interval when the station listens to the one or more neighboring stations. The second time interval is a measurement gap. The first time interval and the second time interval are scheduled to avoid overlapping.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with scheduling measurement gaps and on-duration intervals for a wireless station. The on-duration intervals are periods of time when wireless communication components of the wireless station are briefly powered on. The on-duration intervals are used to maintain communications between a base station and the wireless station even though the wireless station is in a power conserving mode.

As mentioned, during the measurement gap, the mobile device cannot receive communications from the first base station. Thus, when using the DRX mode, if a time period for the measurement gap overlaps with the on-duration interval of the DRX mode, then difficulties between the mobile device and the first base station may occur such as lost communications and/or delays in receiving communications. In one embodiment, a controller is configured to schedule the measurement gaps and the on-duration intervals in order to avoid overlapping.

Figure 1:
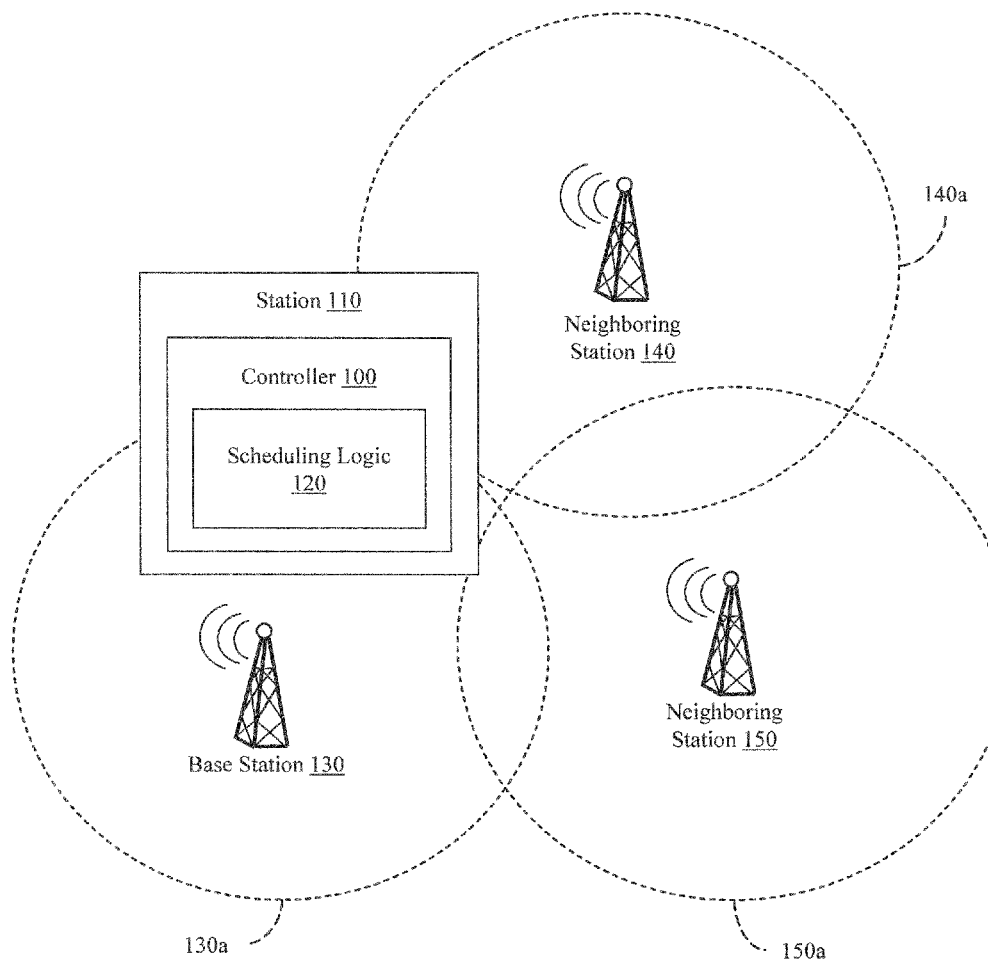
FIG. 1 illustrates one embodiment of a controller associated with scheduling measurement gaps and on-duration intervals.

FIG. 1 illustrates one embodiment of a controller 100 that is associated with scheduling measurement gaps and on-duration intervals. In one embodiment, the controller 100 is embodied in a station 110 that is part of a mobile device. The station 110 may conserve power by operating in a DRX mode, a sleep mode, or other power saving mode. Accordingly, the controller 100 includes one or more logics (e.g., scheduling logic 120) that are configured to schedule communication intervals that are performed by the station 110 while in a power saving mode. The communication intervals scheduled by the scheduling logic 120 can include a measurement gap and an on-duration interval. The on-duration interval is, for example, an active period of time associated with the DRX mode when the station 110 receives control information from a base station 130. The measurement gap is a period of time during which the station 110 measures attributes about neighboring stations.

The station 110 is, for example, a wireless network interface card (NIC) that is part of the mobile device (not shown), e.g., a cellular telephone, a tablet computer, a user equipment (UE), and so on. While the controller 100 is illustrated as being embodied in the station 110 that is part of the mobile device, in another embodiment, the controller 100 is embodied in a base station (e.g., the base station 130, a neighboring station 140, and a neighboring station 150) that provides network access to many mobile devices.

The base station 130 is a base transceiver station (BTS) that provides wireless access to a network for mobile devices within a wireless range 130a. In FIG. 1, dashed circle 130a represents a wireless range of the base station 130. The wireless range 130a is an effective communication range of the base station 130 within which the base station 130 can communicate with wireless devices (e.g., station 110). In one embodiment, the base station 130 is a node B, an evolved node B (eNB), a wireless access point (WAP), or other wireless station that provides network access to wireless devices (e.g., station 110).

For purposes of this disclosure, the base station 130 is labeled as a "base station" to indicate that the station 110 is connected to a network through the base station 130. However, the designation of "base station" is not intended to indicate that the base station 130 has capabilities different from the neighboring stations 140, 150, but only to indicate that the station 110 is connected to the network through the base station 130 and not through the neighboring stations 140 and 150. The base station 130 and the neighboring stations 140 and 150 communicate using, for example, the worldwide interoperability for microwave access (WiMAX) standard, the wideband code division multiple access (WCDMA) standard, the Long term evolution (LTE) standard, LTE advanced standard, the universal mobile telecommunications system (UMTS) standard, a standard that is compatible with the previously listed standards, and so on.

While FIG. 1 illustrates only two neighboring stations (e.g., neighboring stations 140, 150), many neighboring stations can be used to provide access to the network when the station 110 leaves the wireless range 130a. The neighboring stations 140, 150 are also base transceiver stations that provide access to the network. The neighboring stations 140 and 150 have wireless ranges represented by dashed circles 140a and 150a, respectively. Accordingly, the base station 130, the neighboring station 140, and the neighboring station 150 form a cellular or mobile network that provides wireless access over a wide geographic area.

As illustrated in FIG. 1, consider that station 110 is within a wireless range of three separate stations (i.e., stations 130, 140, 150). Thus, the station 110 can receive signals from the base station 130 and the neighboring stations 140, 150. For this discussion, consider that station 110 is primarily located within the wireless range 130a of the base station 130, which is why the station 110 is communicating via the base station 130. Because the station 110 accesses the network through the base station 130, the station 110 does not receive communications from the neighboring stations 140, 150 except to perform measurements of a measurement gap. As previously discussed, the measurement gap is a period of time when the station 110 measures properties of signals from neighboring stations (e.g., the neighboring stations 140, 150) in order to obtain information about the neighboring stations. The station 110 can use the information obtained during the measurement gap to subsequently transition from the base station 130 to the neighboring station 140 or the neighboring station 150.

The measurement gap is a period of time that is scheduled for the station 110. The measurement gap is necessary because the base station 130 and the neighboring stations 140, 150 transmit at different frequencies, but the station 110 can only tune to one frequency at a time. Therefore, the station 110 cannot listen to the neighboring stations 140, 150 at the same time as the base station 130. For this reason, the measurement gap is scheduled so that station 110 can momentarily stop communicating with the base station 130 and change frequencies to listen to the neighboring stations 140, 150. However, since the station 110 is tuned to a different frequency during the measurement gap than the frequency of the base station 130, the station 110 cannot receive communications from the base station 130 during the measurement gap.

In previous implementations, the measurement gap and the on-duration interval were scheduled independently. For example, the base station 130 would schedule the measurement gap at a first time and schedule the on-duration interval at a second time without regard to the timing of the measurement gap. As a result of independently scheduling the two time periods, conflicts between the on-duration interval and the measurement gap would occur. To address the possible conflict, the scheduling logic 120 is configured to schedule the measurement gap and the on-duration interval so that conflicts do not occur (e.g., ensure that the time periods do not overlap each other).

First, consider that the on-duration interval and the measurement gap are scheduled differently depending on, for example, a connection mode for the station 110. The connection mode of the station is separate from and in addition to a sleep mode (e.g., power saving mode, DRX mode) that the station 110 is operating in. In one embodiment, the station 110 operates in one of two different connection modes, a connected mode or an idle mode. The connected mode is, for example, a radio resource control (RRC) connected mode or similar mode. During the connected mode, the station 110 monitors control signals and is actively transmitting and receiving data during on-duration intervals.

By contrast, the idle mode is, for example, a radio resource control (RRC) idle mode or similar mode. During the idle mode, the station 110 does not have open data connections and is, for example, monitoring a paging channel for incoming calls during an on-duration interval. While the station 110 may not have open data connections while in idle mode, the station 110 is still connected to the network through the base station 130. Additionally, during the idle mode, the station 110 is authorized to communicate with the base station 130 and may receive data after transitioning back to the connected mode after receiving a paging signal that indicates a connection request.

In addition to the different connection modes, consider that in one embodiment the controller 100 is embodied in the station 110, and thus the scheduling occurs locally at the station 110. In another embodiment, each station (e.g., stations 130, 140, 150) can include a controller 100 for scheduling on-duration intervals and measurement gaps for devices that are communicating with the base stations. In an embodiment where the controller 100 is located within a base station (e.g., base station 130), the base station 130 schedules the measurement gap and the on-duration interval and provides the schedule to a mobile device for which it is intended.

Figure 2:
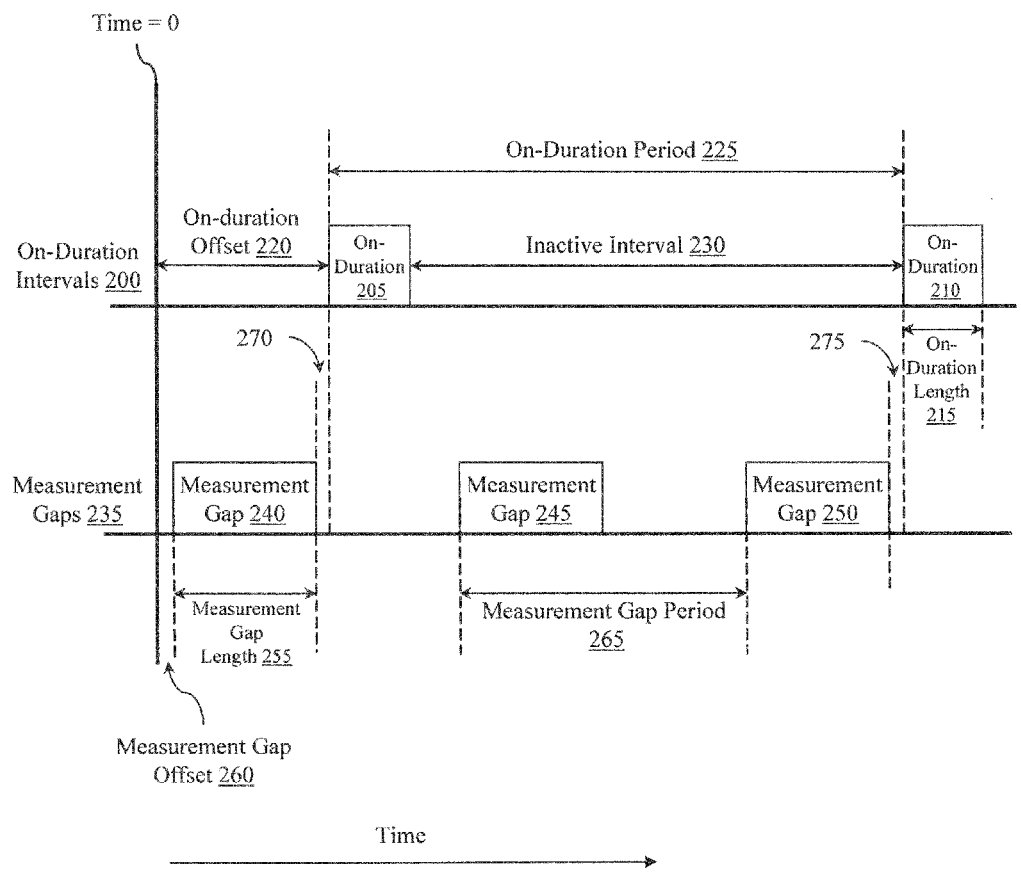
FIG. 2 illustrates an example of a timing diagram for on-duration intervals and measurement gaps.

Now, consider FIG. 2, which illustrates example timing diagrams for on-duration intervals and measurement gaps scheduled by the scheduling logic 120. FIG. 2 will be discussed in conjunction with the elements of FIG. 1. In FIG. 2, the top timeline 200 illustrates an on-duration interval 205 and an on-duration interval 210. The on-duration intervals 205, 210 have a length 215 ($L_d$) in units of time. An on-duration offset 220 ($Q_d$) buffers the initial on-duration interval 205 from the beginning of a scheduling period. The beginning of the scheduling period is denoted in FIG. 2 as time=0. The scheduling period is a reference time used to coordinate scheduling an initial on-duration interval and an initial measurement gap.

An on-duration period ($P_d$) 225 is a time between occurrences of on-duration intervals. The on-duration period ($P_d$) 225 comprises, for example, the on-duration interval 205 and an inactive interval 230. The inactive interval 230 is a period of time when the station 110 of FIG. 1 may be in a low power state to conserve power. However, the inactive period 230 will often be partially consumed by other functions (e.g., measurement gaps) that require the station 110 to be active. The on-duration interval 205 and the inactive interval 230 comprise, for example, a DRX cycle, a sleep mode cycle, and so on. The on-duration length ($L_d$) 215, the on-duration offset ($Q_d$) 220, and the on-duration period ($P_d$) 225 are on-duration parameters that define the on-duration intervals 205 and 210, and how the on-duration intervals 205, 210 will be scheduled.

The bottom timeline 235 illustrates scheduled measurement gaps 240, 245, 250. The measurement gaps 240, 245, 250 have a length ($L_m$) 255. A measurement gap offset ($Q_m$) 260 buffers the initial measurement gap 240 from the beginning of the scheduling period at time=0. A measurement gap period ($P_m$) 265 is a time between occurrences of measurement gaps. Additionally, in FIG. 2, a value 270 and a value 275 illustrate gaps in time between occurrences of the on-duration intervals (e.g., on-duration intervals 205, 210) and the measurement gaps (e.g., measurement gaps 240, 250). The values 270, 275 illustrate how the measurement gaps and the on-duration intervals do not overlap or otherwise conflict in scheduling. In one embodiment, a portion of the values 270, 275 may include a value Delta ($\Delta$). The value Delta ($\Delta$) is a period of time for the station 110 of FIG. 1 to transition from listening to a neighboring station (e.g., neighboring station 140), back to listening to the base station 130. The value Delta ($\Delta$) is a delay associated with hardware in the station 110 changing between frequencies. The measurement gap length ($L_m$) 255, the measurement gap offset ($Q_m$) 260, the measurement gap period ($P_m$) 265, and the value Delta ($\Delta$) are measurement gap parameters that define the measurement gaps 240, 245, 250 and how the measurements gaps 240, 245, 250 are scheduled.

While the on-duration parameters and the measurement gap parameters are shown in FIG. 2, the parameters are determined from, for example, different sources (e.g., the base station 130). In one embodiment, one or more of the parameters are calculated using known parameters. For example, consider that the station 110 is currently in the idle mode. Recall that during the idle mode, the station 110 monitors for paging signals from the base station 130. When the station 110 is in the idle mode, the scheduling logic 120 is configured to determine the on-duration parameters by using paging signal parameters that define the paging signals from the base station 130.

Accordingly, the on-duration parameters are chosen to coincide with parameters that define the paging signals from the base station 130. Because the base station 130 transmits the paging signals, parameters for the paging signals are acquired from the base station 130. The parameters for the paging signals are then used for the on-duration parameters. For example, the paging signal parameters are defined by a paging occasion of the paging signal. An individual paging signal occurs at a paging occasion in a paging frame. The paging frame is one radio frame. The paging occasion is one sub-frame of the paging frame. Thus, the on-duration interval is scheduled to coincide with the one sub-frame that is the paging occasion.

The scheduling logic 120 can acquire the paging occasion parameters from the base station 130 or the parameters may be predefined. For example, the on-duration length is set to a paging occasion length (e.g., $L_d$=1 ms), the on-duration offset is set to a paging occasion offset (e.g., $Q_d$=34 ms), and the on-duration interval period is set to the paging signal period (e.g., $P_d$=640 ms). While the paging signal parameters are determined by the base station 130, in an embodiment where the controller 100 is embodied in a mobile device, the scheduling logic 120 can request preferred paging signal parameters (e.g., a paging period that corresponds with a preferred on-duration period) from the base station 130. However, the base station 130 must confirm the requested parameters for them to be used. This is because the paging signal is controlled and transmitted by the base station 130, which accounts for many stations other than just the station 110.

With regard to the measurement gap parameters, the measurement gap length 255 (e.g., $L_m$=6 ms), the measurement gap period 265 (e.g., $P_m$=1280 ms), and the value Delta $\Delta$ (e.g., 1 ms) can be predefined according to specifications of the station 110 or selected by the scheduling logic 120 based on current operating specifications of the station 110. The length 255 and the period 265 are not controlled by the base station 130 when the station 110 is in the idle mode. The scheduling logic 120 determines the measurement gap offset 260 ($Q_m$) by using the known parameters to calculate the measurement gap offset 260. Consider the following equation.

$$Q_m = Q_d - L_m - \Delta \pmod{P_m} = 34 - 6 - 1 \pmod{1280} = 27 \text{ ms} \qquad \text{Equation 1}$$

$Q_d$ is the on-duration offset 220.
$L_m$ is the measurement gap length 255.
$P_m$ is the measurement gap period 265.
$\Delta$ is the hardware constraint of the station 110.

By using Equation 1 to determine the measurement gap offset $Q_m$ 260, the measurement gap can be scheduled to avoid overlapping with the on-duration interval in the idle mode. In one embodiment, scheduling the measurement gap by using Equation 1 to calculate the measurement gap offset 260 results in the measurement gap 240 occurring directly prior to the on-duration interval 205 (e.g., sequential to each other). Scheduling of the measurement gap 240 includes defining the measurement gap 240 using the measurement gap parameters within the scheduling period. Once the initial measurement gap 240 has been scheduled, subsequent measurement gaps 245, 250 can be scheduled based on the measurement gap period 265. In this way, measurement gaps can be scheduled to re-occur automatically based on the period 265 and do not conflict with on-duration intervals.

Similarly, scheduling of the on-duration interval 205 includes defining the on-duration interval 205 using the on-duration parameters within the scheduling period. Once the initial on-duration interval 205 has been scheduled, subsequent on-duration intervals (e.g., on-duration interval 210) can be scheduled based on the on-duration period 225. In this way, the on-duration intervals and the measurement gaps can be scheduled to avoid overlapping. The measurement gap offset 260 ensures that the on-duration intervals and the measurement gap intervals do not conflict since the offset 260 is defined based on the other parameters (e.g., the on-duration offset 220, and so on). Thus, once the measurement gap parameters and the on-duration parameters are all known, the order in which the measurement gaps and the on-duration intervals are scheduled is not important because the parameters have been defined to avoid conflicts.

In contrast to the idle mode, during the connected mode, the on-duration parameters are not dictated by the paging signal, as in the idle mode. Thus, scheduling of the on-duration interval and the measurement gap occurs differently than in the idle mode. In the connected mode, the scheduling logic 120 schedules the on-duration interval 205 and the measurements gap 240 to avoid conflicts by calculating the on-duration offset 220.

For example, in the connected mode, the station 110 monitors multiple types of data packets and control signals during the on-duration interval, not just the paging signal as in the idle mode. Additionally, in the connected mode, the measurement gap parameters are predefined and known by the station 110 or are broadcast by the base station 130 to the station 110. Thus, the scheduling logic 120 does not determine the measurement gap offset 260 based on other known parameters. Instead, the scheduling logic 120 determines the on-duration offset 220 and schedules the on-duration interval 205 to avoid conflicting with the measurement gap 240. In one embodiment, conflicts are avoided by the scheduling logic 120 scheduling the measurement gaps prior to the on-duration interval.

Additionally, if the controller 100 is embodied in a mobile device (e.g., station 110) and is not part of the base station 130, then the scheduling logic 120 requests permission from the base station 130 to schedule the on-duration interval 205. For example, the scheduling logic 120 can calculate the on-duration offset 220 to ensure that the on-duration interval does not overlap with the measurement gap and then confirm the scheduling with the base station 130 in a request. In this way, the scheduling logic 120 can ensure that the base station 130 is synchronized with the station 110. When the controller 100 is in a mobile device, confirming the calculated on-duration offset verifies, for example, that there are no conflicts with other stations communicating with the base station 130. The verification is used because the base station 130 traditionally selects the on-duration parameters.

In the connected mode, the scheduling logic 120 is configured to determine the measurement gap parameters (e.g., $Q_m$, $P_m$, $L_m$, $\Delta$). These parameters are, for example, pre-determined or determined by the base station 130 according to performance requirements of the station 110.

Consider the following example.

$L_m$ 255 is a fixed value (e.g., 6 ms) that is used with all devices communicating with the base station 130. $P_m$ 265 is a value (e.g., 80 ms) selected by the base station 130 according to measurement requirements of the station 110. $Q_m$ 260 is a value (e.g., 0 ms) selected by the base station 130 according to performance requirements of the station 110. The value Delta $\Delta$ is a value (e.g., 0.5 ms) that is, for example, requested by the scheduling logic 120 in a request to the base station 130, assumed by the base station 130 based on typical operating parameters of the station 110, or is otherwise predefined.

The scheduling logic 120 also determines the on-duration parameters (e.g., $L_d$, $P_d$). $L_d$ 215 is a value (e.g., 4 ms) selected by the base station 130 according to, for example, sleep mode or DRX mode requirements. $P_d$ 225 is a value (e.g., 320 ms) selected by the base station 130 according to, for example, sleep mode or DRX mode requirements.

Values for the on-duration parameters and the measurement gap parameters are confirmed by or provided by the base station 130 to the controller 100. The scheduling logic 120 can then use the values of the measurement gap parameters and the on-duration parameters to determine the on-duration offset 220 by calculating the on-duration offset 220. For example, consider the following:

$$Q_d = Q_m + L_m + \Delta = 0 + 6 + 0.5 = 6.5 \text{ ms} \qquad \text{Equation 2}$$

Equation 2 provides the on-duration offset 220. The on-duration offset 220 from Equation 2 ensures that the on-duration interval 205 and the measurement gap 240 do not overlap. Additionally, consider the following conditions.

Condition 1: $P_d/P_m = k$, where k is some positive integer.
Condition 2: $L_m + L_d + \Delta <= \min(Pm, Pd)$.

If condition 1 and condition 2 are true for the values, then the on-duration offset 220 calculated from equation 2 will result in the on-duration interval 205 and the measurement gap 240 not overlapping. Thus, in one embodiment, the scheduling logic 120 is configured to check the conditions 1 and 2, and if either condition fails, the scheduling logic 120 can request different parameters from the base station 130 that satisfy the conditions 1 and 2.

Additionally, once the on-duration offset 220 is calculated, the scheduling logic 120 requests confirmation of the value from the base station 130. The scheduling logic 120 may request confirmation of the value when, for example, the controller 100 is not located in the base station 130, but is instead in the station 110. If the controller 100 is located in the base station 130, then the scheduling logic 120 communicates the calculated on-duration offset 220 to the station 110.

Figure 3:
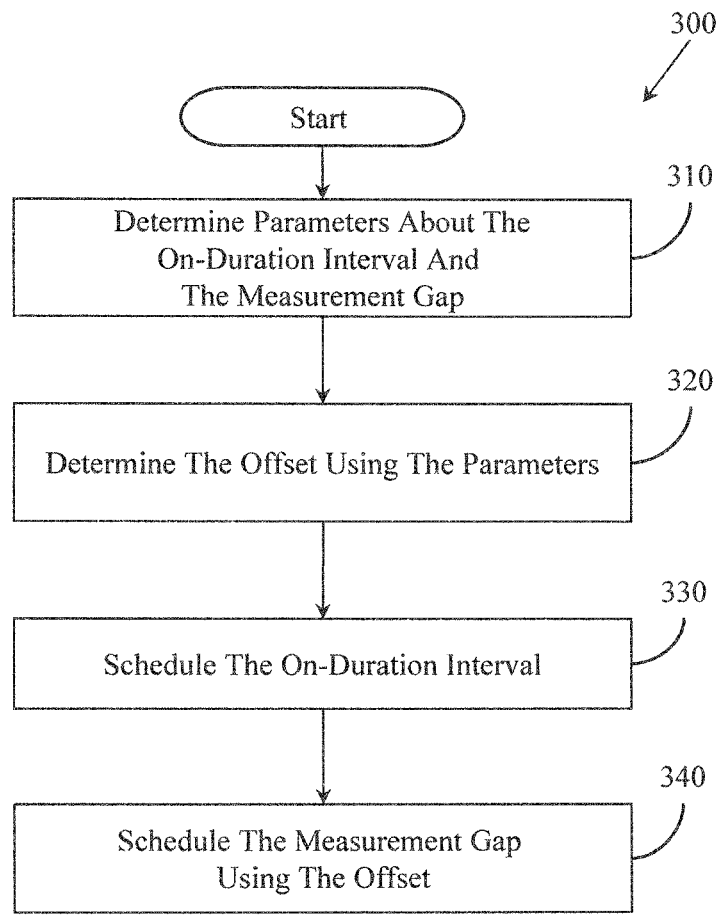
FIG. 3 illustrates one embodiment of a method associated with scheduling measurement gaps and on-duration intervals.

Further details of scheduling measurement gaps and on-duration intervals are discussed with reference to FIG. 3. FIG. 3 illustrates one embodiment of a method 300 associated with scheduling measurement gaps and on-duration intervals while the station 110 is in the idle mode. FIG. 3 will be discussed from the perspective of the controller 100 of FIG. 1.

At 310, the method 300 begins by determining on-duration parameters and measurement gap parameters. The on-duration parameters and the measurement gap parameters are used when scheduling the on-duration interval and the measurement gap, respectively. In one embodiment, the on-duration parameters (e.g., an on-duration offset, on-duration length, etc.) are determined from characteristics of a paging signal that is transmitted by the base station 130. The paging signal is a signal used by the base station 130 to inform the station 110 of, for example, incoming connections for which the station 110 needs to be active.

At 320, an offset is determined using the measurement gap parameters and the on-duration parameters from 310. The offset is an amount of time from the beginning of a scheduling period until the beginning of the measurement gap. To determine the offset for the measurement gap, the offset is, for example, calculated from the on-duration parameters and the measurement gap parameters. The Equation 1, discussed previously, can be used to calculate the value of the offset in the idle mode. Alternatively, the Equation 2 can be used to calculate the offset for the on-duration interval in the connected mode.

At 330, the on-duration interval is scheduled by using the on-duration parameters determined at 310. Scheduling the on-duration interval includes, for example, defining a period of time that conforms to the on-duration parameters. The station 110 is then permitted to perform the functions associated with the on-duration interval during this time period. In general, the period of time is defined in reference to the beginning of a scheduling period. The scheduling period is an arbitrary reference time used for defining the scheduling of the on-duration interval and the measurement gap in relation to each other. As previously discussed in relation to FIG. 2, the scheduling period is defined from a point in time referenced as time=0. In this way, the measurement gap and the on-duration interval can be scheduled from the same relative reference time.

At 340, the measurement gap is scheduled using the offset determined at 320. Scheduling the measurement gap includes, for example, defining a period of time that conforms to the measurement gap parameters, which include the calculated offset. The station 110 is then permitted to perform the functions associated with the measurement gap during this time period. By calculating the value of the offset and using the calculated value to schedule the measurement gap, the method 300 can ensure that the measurement gap does not overlap with the on-duration interval. This is because the value of the offset is calculated from on-duration parameters that define when the on-duration interval will be scheduled. Thus, using these parameters to calculate the offset of the measurement gap safeguards against the measurement gap conflicting with the on-duration interval.

While the method 300 is discussed as occurring from the station 110, in another embodiment, the base station 130 may perform the method 300 and thus the base station 130 determines the on-duration parameters and the measurement gap parameters and provides them to the station 110 to control the station to perform the on-duration interval and the measurement gap.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A controller for controlling a station that wirelessly communicates with a base station, wherein the station is within a wireless range of the base station and one or more neighboring stations, the controller comprising:
    a scheduling logic configured to
        control the station, while the station is in an idle mode, to receive control information from the base station by scheduling a period of time for an on-duration interval during which the control information is received; and
        control the station to listen to the one or more neighboring stations by scheduling a period of time for a measurement gap, wherein the measurement gap is scheduled to avoid overlapping with the on-duration interval by calculating an offset from a beginning of a scheduling period for the measurement gap.

2. The controller of claim 1, wherein the scheduling logic is further configured to
    prior to scheduling the on-duration interval and the measurement gap, determine on-duration parameters that define the on-duration interval and measurement gap parameters that define the measurement gap; and
    determine the offset for the measurement gap based, at least in part, on the on-duration parameters received from the base station and the measurement gap parameters, wherein the scheduling logic is configured to use the offset to schedule the measurement gap during a time interval that does not overlap with the on-duration interval.

3. The controller of claim 1, wherein the scheduling logic is configured to calculate the offset from an on-duration offset, a measurement gap length and a measurement gap period.

4. The controller of claim 2, wherein a length of the on-duration interval equals a length of a paging occasion in a paging frame, and wherein the on-duration interval is part of a discontinuous reception (DRX) cycle.

5. The controller of claim 1, wherein the scheduling logic is embodied in the base station.

6. The controller of claim 1, wherein the scheduling logic is embodied in the station that is located remotely from the base station.

7. The controller of claim 1, wherein the scheduling logic is configured to schedule the measurement gap immediately prior to the on-duration interval.

8. A method for controlling a station that communicates wirelessly with a base station, wherein the station is within a wireless range of the base station and one or more neighboring stations, the method comprising:
scheduling, for the station, a first time interval for when the station receives control information about a communication channel with the base station, wherein the first time interval is an on-duration interval of the station, and wherein the station is in an idle mode; and
scheduling, for the station, a second time interval for when the station listens to the one or more neighboring stations, wherein the second time interval is a measurement gap, and wherein the second time interval is scheduled to avoid overlapping with the on-duration interval by calculating an offset from a beginning of a scheduling period for the measurement gap.

9. The method of claim 8, further comprising:
prior to scheduling the first time interval and the second time interval, determining on-duration parameters that define the on-duration interval and measurement gap parameters that define the measurement gap;
determining the offset for the measurement gap based, at least in part, on the on-duration parameters and the measurement gap parameters, wherein scheduling the second timer interval includes using the offset to ensure that the second time interval does not conflict with the first time interval.

10. The method of claim 9, wherein the on-duration parameters include an offset, a period, and a length, wherein the measurement gap parameters include a period and a length, and wherein determining the offset includes calculating the offset from the offset of the on-duration parameters and the period and the length of the measurement gap parameters.

11. The method of claim 9, wherein a length of the on-duration interval equals a length of a paging frame for a paging occasion, wherein the on-duration interval is part of a discontinuous reception (DRX) cycle.

12. The method of claim 8, wherein the base station schedules the measurement gap for the station.

13. The method of claim 8, wherein the station schedules the measurement gap and the on-duration interval.

14. The method of claim 8, wherein the measurement gap is scheduled prior to the on-duration interval.

15. A method for controlling a station to communicate wirelessly with a base station and one or more neighboring stations, the method comprising:
scheduling, for the station, a first time interval when the station receives information from the base station, wherein the first time interval is an on-duration interval of the station;
scheduling, for the station, a second time interval when the station listens to the one or more neighboring stations, wherein the second time interval is a measurement gap, and wherein the first time interval and the second time interval are scheduled to avoid overlapping; and
prior to scheduling the first time interval and the second time interval, determining an offset for the on-duration interval based, at least in part, on on-duration parameters and measurement gap parameters,
wherein the offset is used when scheduling the first time interval to ensure that the first time interval does not overlap with the second time interval, wherein the on-duration parameters define the on-duration interval, wherein the measurement gap parameters define the measurement gap, wherein the measurement gap parameters include a hardware constraint value, and wherein the station is in an connected mode.

16. A method for controlling a station to communicate wirelessly with a base station and one or more neighboring stations, the method comprising:
scheduling, for the station, a first time interval when the station receives information from the base station, wherein the first time interval is an on-duration interval of the station; and
scheduling, for the station, a second time interval when the station listens to the one or more neighboring stations, wherein the second time interval is a measurement gap, and wherein the first time interval and the second time interval are scheduled to avoid overlapping; and
prior to scheduling the first time interval and the second time interval, determining an offset for the measurement gap based, at least in part, on on-duration parameters and measurement gap parameters,
wherein the offset is used when scheduling the second time interval to ensure that the second time interval does not overlap with the first time interval, wherein the on-duration parameters define the on-duration interval, wherein the measurement gap parameters define the measurement gap, wherein the measurement gap parameters include a hardware constraint value, and wherein the station is in an idle mode.

17. The method of claim 16, wherein the base station schedules the first time interval and the second time interval, and wherein the base station broadcasts the first time interval and the second time interval to the station.

18. The method of claim 16, wherein the base station schedules the first time interval and the second time interval based, at least in part, on a request from the station.

19. The method of claim 16, wherein the station schedules the first time interval and the second time interval without intervention from the base station.

* * * * *